US007734277B2

(12) United States Patent
Baken et al.

(10) Patent No.: US 7,734,277 B2
(45) Date of Patent: Jun. 8, 2010

(54) CONCEPT FOR ENABLING ACCESS TO A NETWORK USING LOCAL WIRELESS NETWORK

(75) Inventors: Nicolaius Henricus Gerardus Baken, Voorburg (NL); Edgar Ferdinand Marcel Van Boven, Amsterdam (NL)

(73) Assignee: Koninklijke KPN N.V., The Hague (NL)

( * ) Notice: Subject to any disclaimer, the term of this patent is extended or adjusted under 35 U.S.C. 154(b) by 576 days.

(21) Appl. No.: 11/597,465

(22) PCT Filed: Jun. 15, 2005

(86) PCT No.: PCT/EP2005/006554

§ 371 (c)(1),
(2), (4) Date: Nov. 22, 2006

(87) PCT Pub. No.: WO2006/002782

PCT Pub. Date: Jan. 12, 2006

(65) Prior Publication Data

US 2008/0069061 A1    Mar. 20, 2008

(30) Foreign Application Priority Data

Jun. 30, 2004    (EP)    ................................. 04076895

(51) Int. Cl.
*H04M 11/00*    (2006.01)
(52) U.S. Cl. .................... 455/406; 455/408; 455/426.1; 379/114.28
(58) Field of Classification Search ................. 370/338, 370/328, 310; 455/426.1, 422.1, 406, 408; 713/183, 201; 379/114.28
See application file for complete search history.

(56) References Cited

U.S. PATENT DOCUMENTS

| 6,950,655 | B2 * | 9/2005 | Hunkeler | ................. 455/426.1 |
| 2001/0039186 | A1 | 11/2001 | Rousseau | .................... 455/406 |
| 2002/0157007 | A1 * | 10/2002 | Sashihara | .................... 713/183 |
| 2003/0036375 | A1 | 2/2003 | Chen et al. | .................. 455/403 |
| 2004/0133806 | A1 * | 7/2004 | Joong et al. | ................. 713/201 |
| 2005/0147068 | A1 * | 7/2005 | Rajkotia | ..................... 370/338 |

FOREIGN PATENT DOCUMENTS

| DE | 197 45 350 | 8/1998 |
| WO | WO 98/19474 | 5/1998 |
| WO | WO 00/28752 | 5/2000 |
| WO | WO 01/76297 | 10/2001 |
| WO | WO 2004/012374 | 2/2004 |

* cited by examiner

*Primary Examiner*—Danh C Le
(74) *Attorney, Agent, or Firm*—De Vries and Metman; Natalya Hartmann

(57) ABSTRACT

A mobile communication network for providing access to a fixed network for access terminals within a geographical area is disclosed. A public mobile network contains a base station connected to a fixed network and is capable of communicating with the access terminals using a communication protocol within a part of the geographical area. A local wireless network is present within another part of the geographical area, wherein the base station is not capable of communicating with the access terminals. The local wireless network is connected to a fixed network via a network access devices. The local wireless network comprises at least one local wireless access point for communicating with the access terminal using the communication protocol. The local wireless network is arranged to send a message to an access terminal in the vicinity of the local wireless network containing an offer relating to call charges.

9 Claims, 3 Drawing Sheets

CONCEPT FOR ENABLING ACCESS TO A NETWORK USING LOCAL WIRELESS NETWORK

FIELD OF THE INVENTION

The present invention relates to a concept for a converged fixed-mobile infrastructure in which local wireless networks are used for enabling access to another network.

BACKGROUND OF THE INVENTION

Broadband services have increasingly been used in the passed years and the use of broadband services will grow in the coming years. One of the development regarding broadband services is that wireless techniques are used in addition to broadband services to enable flexibility for the user. This can be accomplished with a local wireless access point is connected to a broadband network resulting in the opportunity for users the use mobile devices (or devices that are upgraded to become mobile devices) for accessing via the access point. An example of this is the WiFi concept where a laptop is provided with 2 wireless network interface card via which the laptop is able to communicate to the wireless access point (Wireless LAN (W-LAN)). In this manner the user has available broadband Internet because the wireless access point is connected via a broadband connection to the Internet. In general, a user can use his mobile device within a radius of about fifty meters around the access point.

This concept can be used to create a wireless home network, in which case a user needs a wireless access point situated in or near the home. The wireless access point is then connected to a fixed network. For example, this connection is a broadband connection to the Internet. A laptop or any other device that is provided with a network interface card for the communication with wireless access point can be used by the user to access the fixed network to which the wireless access point is connected. In other words, there is according to such a concept a local wireless network that results in not being limited to one or more specific physical locations in the house. The user can with this concept use his device on any physical location in or near the house as long as it is within the range of the wireless access point.

However, the drawback of the prior art is that in this concept the local wireless network can be used profitable only by the user who lives in the house where the local wireless network is present. In other words, usage of a wireless access point is only privately.

AIM OF THE INVENTION

It is an object of the invention to eliminate the drawbacks of the prior art and to provide an efficient concept for enabling access to a network via a local wireless network.

SUMMARY OF THE INVENTION

In accordance with this invention, a concept and an apparatus are disclosed for the housing of active and passive network elements of a communication network. For this purpose, the concept according to the present invention comprises:

Usage of a local wireless network comprising a wireless access point and a network access device which is connected to a network for enabling public access via an access terminal to the network.

In a first aspect of the invention a concept is disclosed for enabling the public usage of a privately used local wireless network for accessing a network using a device. The local wireless network can comprise a wireless access point that is present in a house or in an office building. If in a house, the wireless local network is used by the inmates of the house for accessing another network such as a fixed network or the Internet. If in an office building, the wireless local network is used for the same purpose but the users form a closed user group that is related to purpose of the office building (for instance the employees of a company housed in de office building). The communication between a user device and the wireless access point can be via any type of wireless protocol, such as UMTS, Bluetooth, DECT or WLAN. The user device can be any type of communication terminal such as a mobile device or a devices that is provided with a wireless interface card. The wireless access point can be connected to a fixed network via a network access device such as an ADSL modem. The fixed network to which the wireless access point is connected can be any type of network such as a broadband network or the Internet. Also combinations are possible, for instance the fixed network can comprise a broadband access network and the Internet. In the case of a broadband network there is often a concentration point such as a DSLAM which is physically outside the boundaries of the house or office building. Also, the communication protocol between the wireless access point and the fixed network can be any kind of communication protocol such as ADSL, ISDN, SDSL, VDSL and FTTH.

When a wireless access point is made accessible for public use, it is possible for a user to have available a higher bandwidth then in the case of using for instance the public mobile network. The user can make use of the local wireless network if the device of the user is provided with an interface suitable to communicate to the wireless access point (e.g. GSM, GPRS, UMTS, WLAN, BlueTooth), and the wireless access point is prepared to service not only the user device that is used for private use but also user devices of other users. The benefit for the user is that there is a higher bandwidth compared to the situation in which the user is using his mobile device for accessing public mobile infrastructure. For instance, the WLAN protocol enables a bandwidth of several Mbit/s, while GPRS enables a maximum bandwidth of 128 kbit/s.

Another aspect of the present invention is that a number of local wireless networks can be used additionally to the infrastructure of a public mobile network such as UMTS. In a geographic area, a UMTS base station could cover just a part of that area while local wireless networks could cover other parts of that area. This would be a benefit for the operator of the mobile network since there is less investment needed in cellular mobile infrastructure. A benefit for the user is that an optimum is achieved regarding the mobility of the user and the bandwidth that is available to the user. With a fixed connection a user has an optimum in bandwidth (for instance several Mbit/s in case of xDSL) but only a small radius of action. With a mobile connection the user has an optimum in mobility but a limited bandwidth (for instance up to 128 kbps in the case of GPRS). If a local wireless network is used by a public user. It is then possible to achieve an optimum regarding the bandwidth and the mobility because the bandwidth of the communication between a user device and a wireless access point is higher than the bandwidth that is available when using public mobile infrastructure. Regarding the mobility of the user there is also an optimum because the access is based on wireless techniques.

The wireless access point and the user device should support the same communication protocol. It can also be that the user device supports multiple communication protocols. The user device is then able to switch between different communication protocols (e.g. double, triple of four fold mode devices), such as GSM, UMTS, WLAN or Bluetooth. The wireless local access point further takes care for the conversion between the wireless communication protocol and the communication protocol that is used in relation to the fixed network to which the local wireless access point is connected.

According to the invention the owner of a local wireless network can become a mini telecom operator that provides access for users to a network that is operated by a telecom operator. Such a mini telco could for instance send a message to a user in the nearness of the local wireless network containing an offer relating to the call charges. It can then be attractive for the user to use the local wireless network that is connected to the fixed network instead of using the public mobile network. The message sent to the user should also contain instructions for the user in order to inform the user how to get access to the wireless access point.

A result of this approach can be that there will be an increase of the amount traffic via the fixed network and a decrease of the amount of traffic via the public mobile network. For a specific mini telco this could mean that the connection to the fixed network is used more intensively which could result better usage rates that have to be paid to the telecom operator that operates the fixed network. So, a relation can exist between the revenues of the mini telco and the costs for the mini telco for using access facilities to a access the network operated by a telecom operator. In this concept it can also be possible that the wireless access point is owned by the mini telco, but it is also possible that the telecom operator of the fixed network owns it. In the latter, the mini telco pays a rental fee for using the wireless access point.

The mini telco could have available supporting facilities for operating the access facility. For instance, a software tool could be available for accounting purposes and for the generation and transmission of instructions for users. For access control there could also be facilities available to the mini telco. For instance, there could only be access to a wireless access point for a closed user group such as users provided with a user name and a password. It is also possible that the mini telco not only provides access services to users but also services such as content services.

There are no limitations in relation to the services that can be used or accessed using the concept according to the invention. The services can for instance be voice services, data services, content services or transaction services. Also, any type of integrated services such as video/audio services are not excluded in relation to this invention.

A benefit for the operator of the fixed network is that there is an alternative way to access the fixed network, which could result in a higher usage of the fixed network. A benefit for an operator of a mobile network is that if a number of mini operators are operational, a lesser degree of penetration of base stations is needed for achieving the some coverage of a mobile network.

BRIEF DESCRIPTION OF THE DRAWING FIGURE

The foregoing aspects and many of attendant advantages of this invention will become better understood by reference to the following detailed description, when taken in conjunction with the accompanying drawing, wherein.

EXEMPLARY EMBODIMENTS

For the purpose of teaching of the invention, preferred embodiments of the method and devices of the invention are described in the sequel. It will be apparent to the person skilled in the art that other alternative and equivalent embodiments of the invention can be conceived and reduced to practice without departing form the true spirit of the invention, the scope of the invention being limited only by the appended claims as finally granted.

Figure 1:
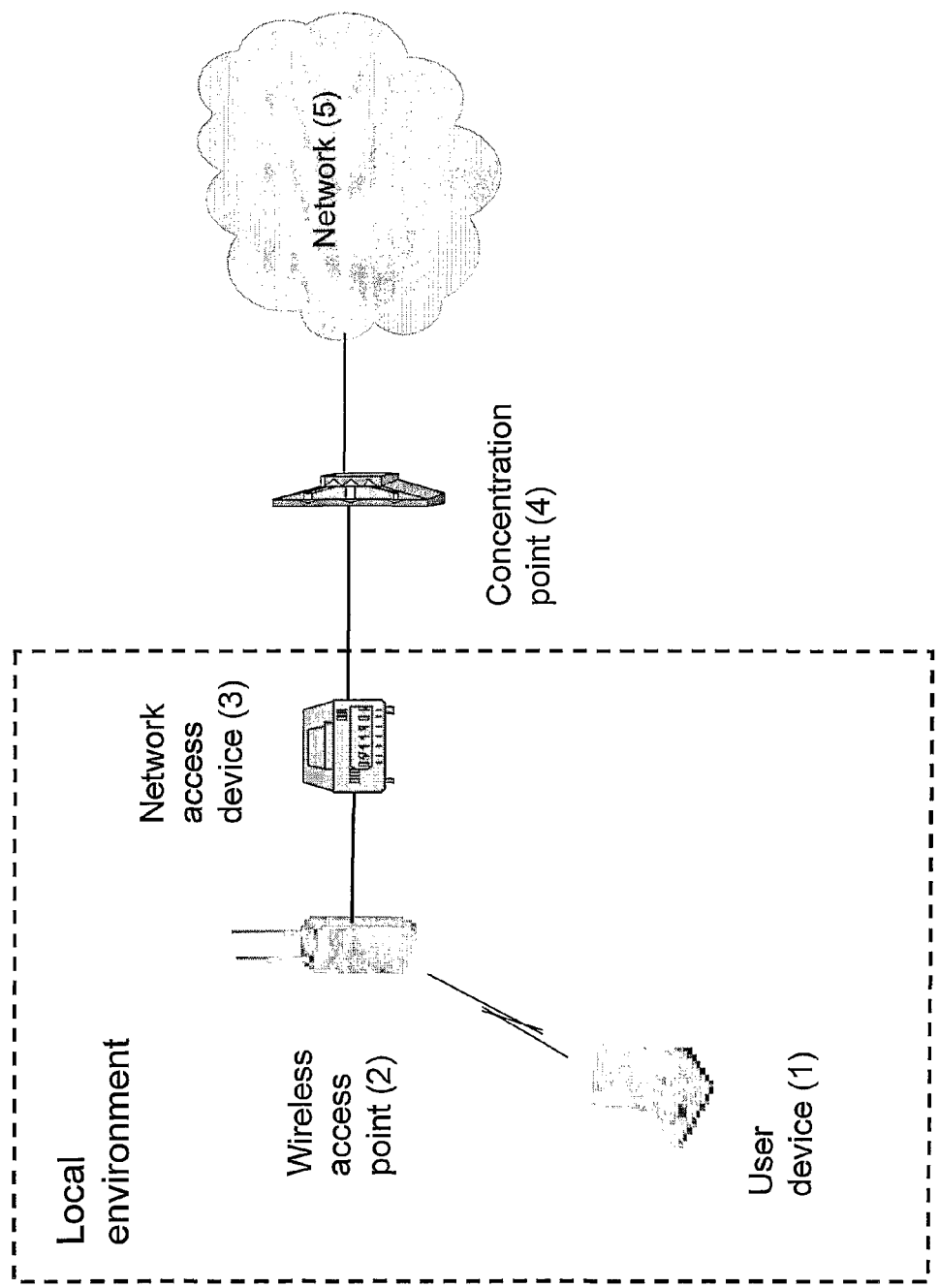
FIG. 1 shows a block diagram illustrating the concept of a privately used local wireless network.

The concept according to the present invention enables the usage of local wireless access points for accessing another network such as a fixed network FIG. 1 shows a local environment such as a house where a wireless access point (2) is available that is connected to a network access device (3). The wireless access point (2) can be a WLAN base station but also any other type of base station (e.g. based on DECT). The network access device can be a modem such as an ADSL modem. Often there is a concentration point (4) such as a DSLAM in the case of a broadband connection. A network (5) can be a fixed network such as a voice network (PSTN), a data network or the Internet. Network (5) can also be a mobile network that is operated by a telecom operator. It can also be the case that there is more than one operator that operate the network (5). Users can access the fixed network (5) and the services via a user device (1) such as a laptop or a telephone. The domain depicted with dashed line is the area which is covered by the wireless access point (2) and does not necessarily has to correspond to the boundaries of the house or building because it might be the case that also outside but near the house or building there is coverage by the wireless access point (2).

Figure 2:
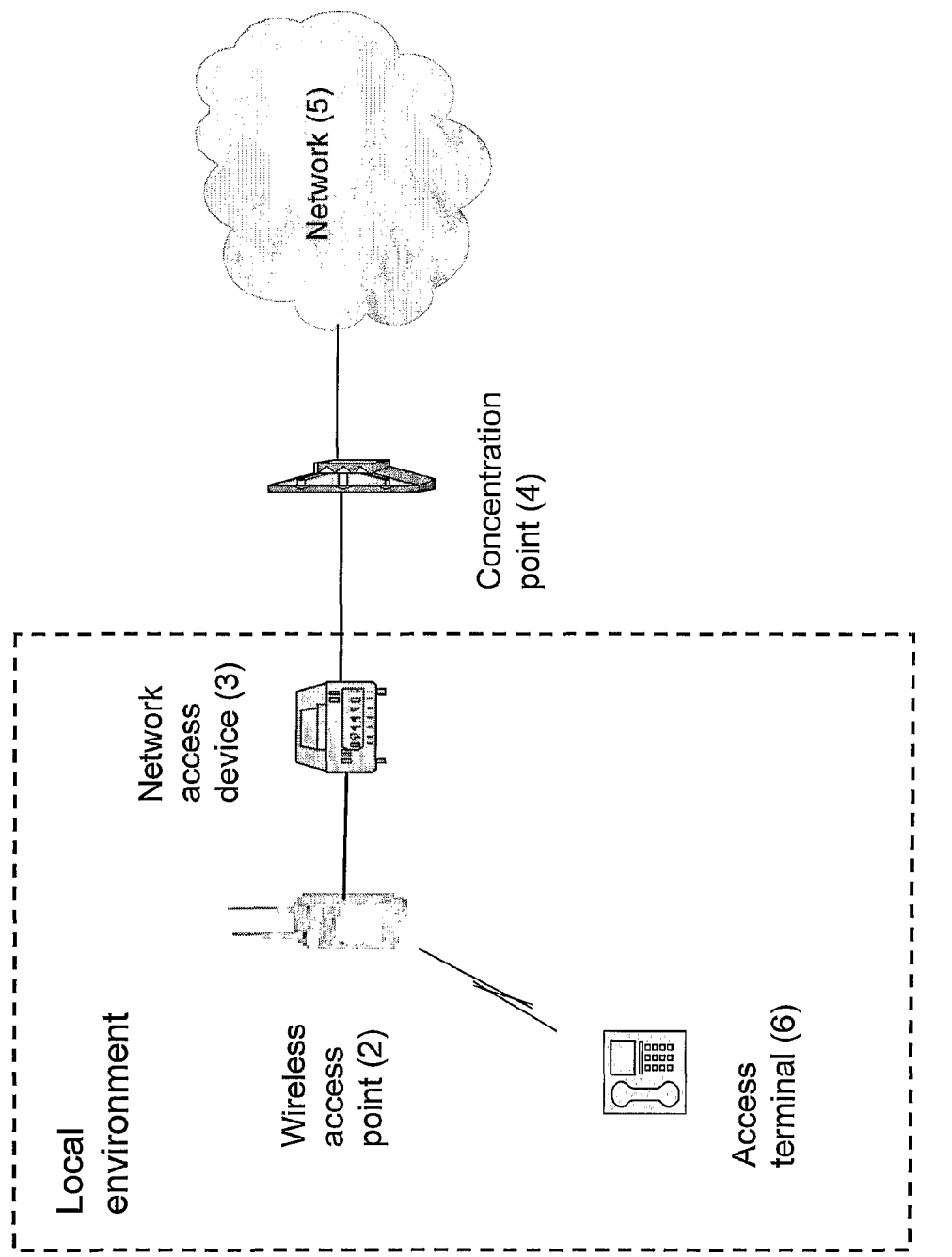
FIG. 2 shows a block diagram illustrating the concept of public accessibility of a local wireless network.

FIG. 2 shows a situation where an access terminal (6) has access to the wireless access point (2). The access terminal (6) is a device that also may be used for accessing a public network such a mobile network. Instead of using access terminal (6) for accessing a public network, access terminal (6) may be used communicate to the wireless access point (2) and thus to access the network (5). Network (5) could be the same network that otherwise is accessed using the access terminal (6) directly. Access terminal (6) may support multiple communication protocols. These types of devices are often called double, triple of four fold mode devices. Protocols supported by the access terminal (6) can be protocols such as GSM, UMTS, WLAN or Bluetooth. An embodiment concerns an access terminal (6) that support GPRS and UMTS. The wireless local access point (2) further takes care for the conversion between the wireless communication protocol used between access device (6) and the wireless access point (2) and the communication protocol that is used in relation in network (5) to which the local wireless access point (2) is connected. The wireless access point (2) and the access terminal (C) support the same communication protocol in order to be able to communicate. The access terminal (6) may be used be a user that is in the nearness of the wireless access point (2). There may me a mechanism for detecting by the access terminal (6) that there is a wireless access point (2) is near. There may also be a mechanism for informing a user of access terminal (6) that a wireless access point (2) is close by. Additional to this information also information could be provided that informs the user of the access terminal (6) how to make use of the wireless access point (2). The user device (1) and the access terminal (6) may or may not be able to communicate simultaneously to the wireless access point (2). That depends on the implementation of the configuration.

Figure 3:
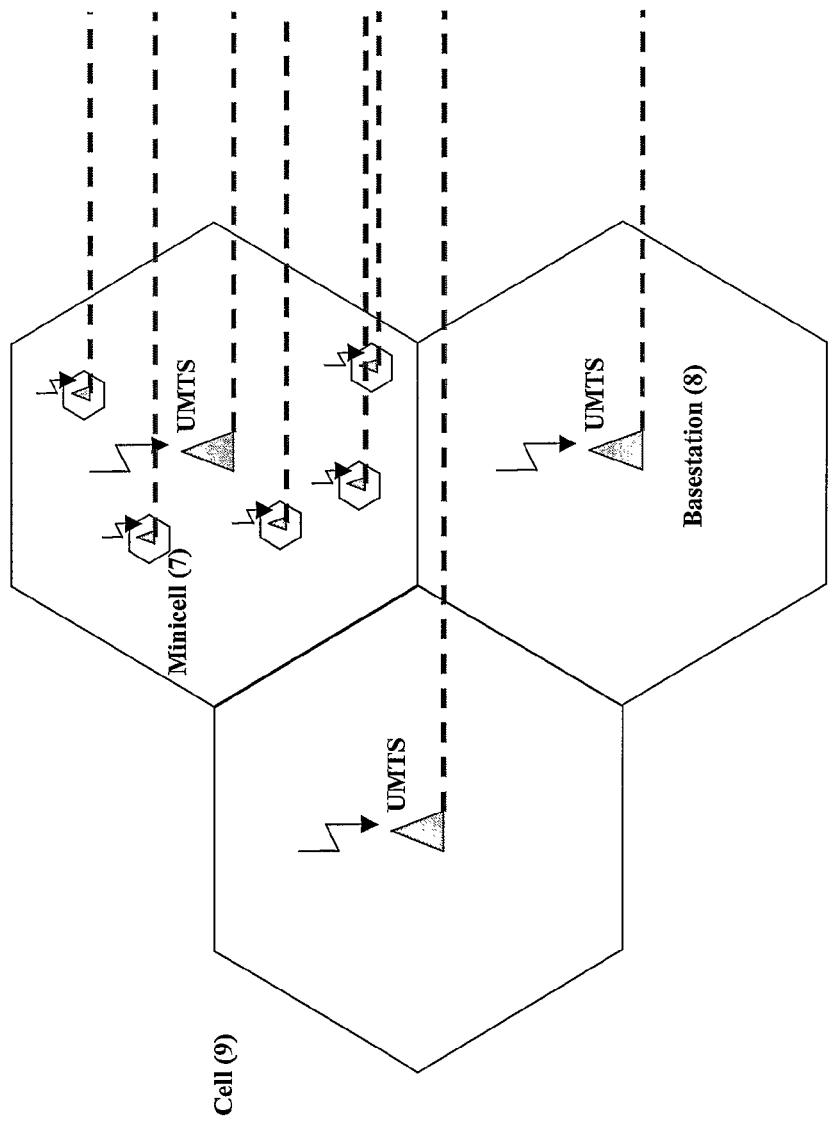
FIG. 3 shows a block diagram illustrating the concept of usage of local wireless networks in addition to infrastructure of a public network.

FIG. 3 shows a block diagram illustrating the concept of the usage of local wireless networks in addition to infrastructure of a public network. In two geographical areas there is only a base station (8) that covers the area. A geographical area is depicted as a cell (9) in the figure. In general, the base station (8) is often connected to fixed infrastructure although wireless access is provided via that base station (8) to users using a wireless device. In another cell (9) there is a mini cell (7) in addition to the base station (8) (for instance a UMTS base station). The mini cell (7) comprises a wireless access point (2) and may also comprise a network device (3) for the connection to the fixed infrastructure of a network. A mini cell (7) may be operated by a mini telco. If a mini cell (7) supports the same communication protocol that is supported by the base station (8). e.g. UMTS, than the mini cell (7) can be used complementary to the base station (8). The base station (8) should then not cover the complete cell area, which results in a number of benefits. For example, the base station (8) in a cell (9) could be provided with less powerful equipment which is cost effective. There could be more than one mini cells (7) in addition to the base station (8) as is depicted in FIG. 3. A benefit for a user is that an optimum is achieved regarding the mobility of that user and the bandwidth that is available to the user. Hand-over techniques could be used in relation to different mini cells (7) in order to achieve an optimal flexibility for the user.

The invention claimed is:

1. A mobile communication network for providing access to a fixed network for access terminals within a geographical area comprising:

a public mobile network containing a base station connected to a fixed network and capable of communicating with said access terminals using a communication protocol within a part of said geographical area, and a local wireless network within another part of said geographical area, wherein the base station is not capable of communicating with said access terminals, connected to a fixed network via a network access device, wherein said local wireless network comprises at least one local wireless access point for communicating with said access terminal using said communication protocol and wherein said local wireless network is arranged to send a message to an access terminal in the vicinity of the local wireless network containing an offer relating to call charges.

2. The network according to claim 1, wherein the fixed network is a broadband network.

3. The network according to claim 1, wherein the access terminal supports UMTS.

4. The network according to claim 1, wherein the access terminal is a mobile phone.

5. The network according to claim 4, wherein the mobile phone supports more than one communication protocol.

6. The network according to claim 1, wherein the local wireless network is operable by a mini-telco.

7. The network according to claim 1, wherein said local wireless network is capable of controlling public access using access procedures.

8. The network according to claim 7, wherein the access procedures comprise use of a user name and a password.

9. The network according to claim 1, wherein the communication protocol is UMTS.

* * * * *